US009668274B1

(12) United States Patent
Bartlett et al.

(10) Patent No.: US 9,668,274 B1
(45) Date of Patent: May 30, 2017

(54) DYNAMIC ALLOCATION OF FREQUENCY BANDS TO USER DEVICES

(71) Applicant: SPRINT COMMUNICATION COMPANY L.P., Overland Park, KS (US)

(72) Inventors: Roger Danforth Bartlett, Merriam, KS (US); Christian Erik Seagren, Pleasanton, KS (US)

(73) Assignee: Sprint Communications Company L.P., Overland Park, KS (US)

(*) Notice: Subject to any disclaimer, the term of this patent is extended or adjusted under 35 U.S.C. 154(b) by 381 days.

(21) Appl. No.: 14/193,816

(22) Filed: Feb. 28, 2014

(51) Int. Cl.
*H04W 72/12* (2009.01)
*H04W 24/02* (2009.01)

(52) U.S. Cl.
CPC ....... *H04W 72/1231* (2013.01); *H04W 24/02* (2013.01)

(58) Field of Classification Search
CPC .......................... H04W 72/1231; H04W 24/02
USPC .......................................................... 370/252
See application file for complete search history.

(56) References Cited

U.S. PATENT DOCUMENTS

| | | | | |
|---|---|---|---|---|
| 2003/0064741 A1* | 4/2003 | Silva | ..................... | H04W 16/18 455/522 |
| 2005/0271009 A1* | 12/2005 | Shirakabe | ............. | H04W 16/10 370/329 |
| 2006/0009230 A1* | 1/2006 | Fukumoto | ............. | H04W 72/02 455/452.1 |
| 2010/0113060 A1* | 5/2010 | Bai | ........................ | H04W 16/14 455/453 |
| 2010/0304730 A1* | 12/2010 | Huang | .............. | H04M 1/72572 455/419 |
| 2010/0323628 A1* | 12/2010 | Shen | ...................... | G01S 5/0252 455/67.11 |
| 2011/0230226 A1* | 9/2011 | Han | ..................... | H04W 52/143 455/522 |
| 2011/0261764 A1 | 10/2011 | Shirakata et al. | | |
| 2011/0261765 A1* | 10/2011 | Nagaraja | ............... | H04L 5/0037 370/329 |
| 2012/0238218 A1* | 9/2012 | Stine | ..................... | H04W 16/00 455/67.11 |
| 2013/0182641 A1* | 7/2013 | Maguire | ................. | H04W 8/00 370/328 |

(Continued)

OTHER PUBLICATIONS

Wikipedia, "Free-space path loss," retrieved Feb. 8, 2016 https://en.wikipedia.org/wiki/Free-space_path_loss.*

(Continued)

*Primary Examiner* — Mark Rinehart
*Assistant Examiner* — Kenneth P Hunt

(57) ABSTRACT

A method, system, and medium are provide for dynamically allocating frequency bands transmitted by a base station to a user device to optimize signal strength at the device. A distance from the base station to the user device is determined, and if the distance is greater than a distance threshold, a lower-frequency band is allocated to the device. If the distance is less than the distance threshold, a penetration loss factor for the device is calculated. If the penetration loss factor is greater than a penetration loss threshold, a lower-frequency band is allocated to the device, and if the penetration loss factor is less than the penetration loss threshold, a higher-frequency band is allocated to the device.

20 Claims, 6 Drawing Sheets

(56) References Cited

U.S. PATENT DOCUMENTS

| | | | | |
|---|---|---|---|---|
| 2013/0258962 A1* | 10/2013 | Oota | ............... | H04W 72/10 370/329 |
| 2014/0038588 A1* | 2/2014 | Ljung | ............... | H04W 52/0216 455/422.1 |
| 2015/0257114 A1* | 9/2015 | Sawada | ............... | H04W 56/001 370/350 |

OTHER PUBLICATIONS

Ubiquiti, "Datasheet NanoStation M NanoStation loco M" 2012-2013.*
Ubiquiti "Data Sheet NanoBeam M," 2013-2015.*
Gibson, "The Communications Handbook," 1997, IEEE Press, p. 1183.*
Kenneth Hunt, "Slope of Signal Strength," Aug. 30, 2016.*
K. P. Hunt, J. J. Niemeier and A. Kruger, "RF communications in underwater wireless sensor networks," Electro/Information Technology (EIT), 2010 IEEE International Conference on, Normal, IL, 2010, pp. 1-6. http://ieeexplore.ieee.org/stamp/stamp.jsp?tp=&arnumber=5612087&isnumber=5612082.*
K. P. Hunt, J. J. Niemeier, and A. Kruger, "Antennas for Mussel-Based Underwater Biological Sensor Networks in Rivers," Proceedings of the Fifth ACM International Workshop on Underwater Networks, Sep. 2010 http://wuwnet.acm.org/2010/papers/016.pdf.*

* cited by examiner

DYNAMIC ALLOCATION OF FREQUENCY BANDS TO USER DEVICES

SUMMARY

A high level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes computer-readable media, methods, and systems for dynamically allocating frequency bands transmitted by a base station to a user device to optimize signal strength at the user device. The determination of which frequency band to allocate to the user device may be based on a number of factors. For example, a distance between the base station and the user device is calculated, and a determination is made whether the distance exceeds a predefined distance threshold. If the distance exceeds the distance threshold, a lower-frequency band is allocated to the user device. Lower-frequency bands, such as, for example, an 800 MHz band typically exhibit less free-space path loss over longer distances as compared to higher-frequency bands such as, for example, a 1900 MHz band or a 2.5 GHz band. Thus, by using the lower-frequency band, signal strength at the device is optimized, and the network subscriber experiences an improved network experience.

If, however, the distance between the user device and the base station does not exceed the predefined distance threshold, a second calculation may be performed. In this instance, a penetration loss factor for the user device is calculated. Penetration loss takes into account degradation in signal strength at the device that is not accounted for simply by the distance of the user device from the base station and the free-space path loss. The penetration loss factor for the device may be high when, for example, the user device is located in a building. When the penetration loss factor for the user device exceeds a predefined penetration loss threshold, a lower-frequency band is allocated to the user device. Besides exhibiting less free-space path loss over longer distances, lower-frequency bands such as, for example, an 800 MHz band typically exhibit greater penetration abilities as compared to higher-frequency bands. Thus, using a lower-frequency band allows for greater penetration into, for example, the building where the user device is located thereby increasing signal strength at the device and improving the subscriber's network experience. On the other hand, if the calculated penetration loss factor for the user device is below the penetration loss threshold, a higher-frequency band is allocated to the user device since the greater penetration abilities of the lower-frequency band are not needed. For those networks that have limited bandwidth in the lower-frequency range, the above solution helps to ensure effective use of the lower-frequency band.

BRIEF DESCRIPTION OF THE FIGURES

Illustrative embodiments of the present invention are described in detail below with reference to the attached drawing figures, and wherein.

DETAILED DESCRIPTION

Figure 1:
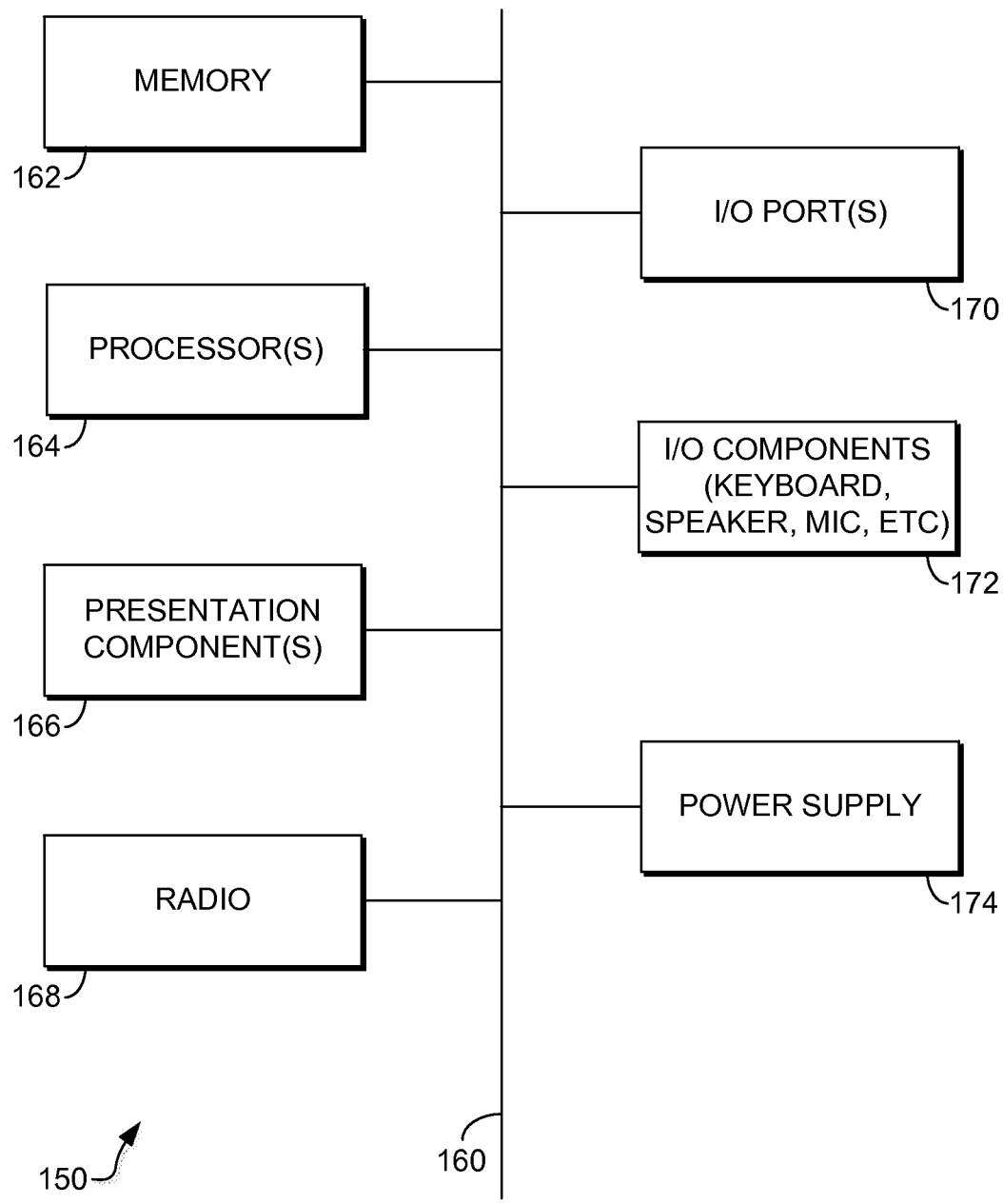
FIG. 1 depicts an exemplary user device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations may be used to aid the understanding of certain concepts pertaining to the associated system and services. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in Newton's Telecom Dictionary, $27^{th}$ Edition (2012). The following is a list of acronyms:

| | |
|---|---|
| BS | Base Station |
| CDMA | Code Division Multiple Access |
| eNodeB | Evolved Node B |
| GIS | Geographic Information System |
| 2GPP | $2^{nd}$ Generation Partnership Project |
| 3GPP | $3^{rd}$ Generation Partnership Project |
| GPRS | General Packet Radio Service |
| GSM | Global System for Mobile Communications |
| LTE | Long-Term Evolution |
| RF | Radio-Frequency |
| UE | User Equipment |
| WCDMA | Wideband Code Division Multiple Access |

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed towards systems, methods, and computer-readable media for dynamically allocating frequency bands transmitted by a base station to a user device to optimize signal strength at the user device based on the distance of the user device from the base station and, optionally, a penetration loss factor associated with the user device. As used throughout this disclosure, the term "dynamically" means occurring in near real time or in real time. Typically, base stations are able to transmit and receive signals using several different frequency bands. Representative frequency bands can range from 700 MHz up to 2.5 GHz. The amount of bandwidth in each frequency band is generally limited and, thus, the efficient use of available bandwidth is desirable. In general, lower-frequency bands such as, for example, 700-900 MHz bands exhibit less free-space path loss over longer distances as compared to higher-frequency bands such as 1900 MHz or 2.5 GHz. As well, lower-frequency bands typically exhibit greater penetration abilities as compared to higher-frequency bands making them ideal to use in situations where the user device may be located in, for example, a building.

Traditional solutions to allocating frequency bands to user devices have generally failed to take into account some of the characteristics of the lower-frequency bands and thus have failed to reserve the lower-frequency bands for those user devices that would most benefit from those characteristics. For example, one traditional allocation scheme is to assign a higher-frequency band to user devices until the bandwidth is full and then to switch new user devices to a different frequency band (either a second higher-frequency band or a lower-frequency band). This solution fails to take into account the signal strength at the device and whether the user device is experiencing low signal strength due to the device being located a far distance from the base station and/or the device being located within, for example, a building or other such structure. Another traditional allocation scheme is to switch the user device to a lower-frequency band only when the signal strength at the user device is zero. Waiting until the signal strength at the device drops to zero can lead to dropped calls, slow data transfer speeds, and an overall poor network experience for the subscriber.

Aspects hereof relate to allocating frequency bands transmitted by a base station to a user device such that signal strength at the user device is optimized and each frequency band is efficiently utilized considering the limited amount of bandwidth available at the base station. Accordingly, in one aspect, there is provided computer-readable media having computer-executable instructions embodied thereon that, when executed, performs a method of dynamically allocating frequency bands transmitted by a base station to a user device to optimize signal strength at the user device. A distance from the base station to the user device is determined, and it is determined whether the distance is greater than or less than a network-configurable distance threshold. If the distance is greater than the distance threshold, a lower-frequency band is allocated to the user device. When the distance is less than the distance threshold, a penetration loss factor for the user device is calculated. When the penetration loss factor is greater than a network-configurable penetration loss threshold, a lower-frequency band is allocated to the user device. And when the penetration loss factor is less than the penetration loss threshold, a higher-frequency band is allocated to the user device.

In a second aspect, there is provided a computerized method carried out by at least one server having at least one processor for dynamically allocating frequency bands transmitted by a base station to a user device to optimize signal strength at the user device. The method comprises calculating a penetration loss factor for the user device and determining, using the at least one processor, if the penetration loss factor is greater than or less than a predefined penetration loss threshold. When the penetration loss factor is greater than the penetration loss threshold, a lower-frequency band is allocated to the user device. And when the penetration loss factor is less than the penetration loss threshold, a higher-frequency band is allocated to the user device.

In a third aspect, there is provided a system for dynamically allocating frequency bands transmitted by a base station to a user device to optimize signal strength at the user device. The system comprises a computing device associated with the base station having one or more processors and one or more computer-readable media. The system further comprises a data store coupled with the base station. The computing device determines a distance from the user device to the base station, and determines if the distance is greater than or less than a predefined distance threshold. When the distance is greater than the predefined distance threshold, the computing device allocates a lower-frequency band to the user device. When the distance is less than the predefined distance threshold, the computing device allocates a higher-frequency band to the user device.

Turning now to FIG. 1, a block diagram of an illustrative user device or communications device is provided and is referenced generally by the numeral 150. Although some components are shown in the singular, they may be plural. For example, the user device 150 might include multiple processors or multiple radios, etc. As illustratively shown, the user device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

Figure 2:
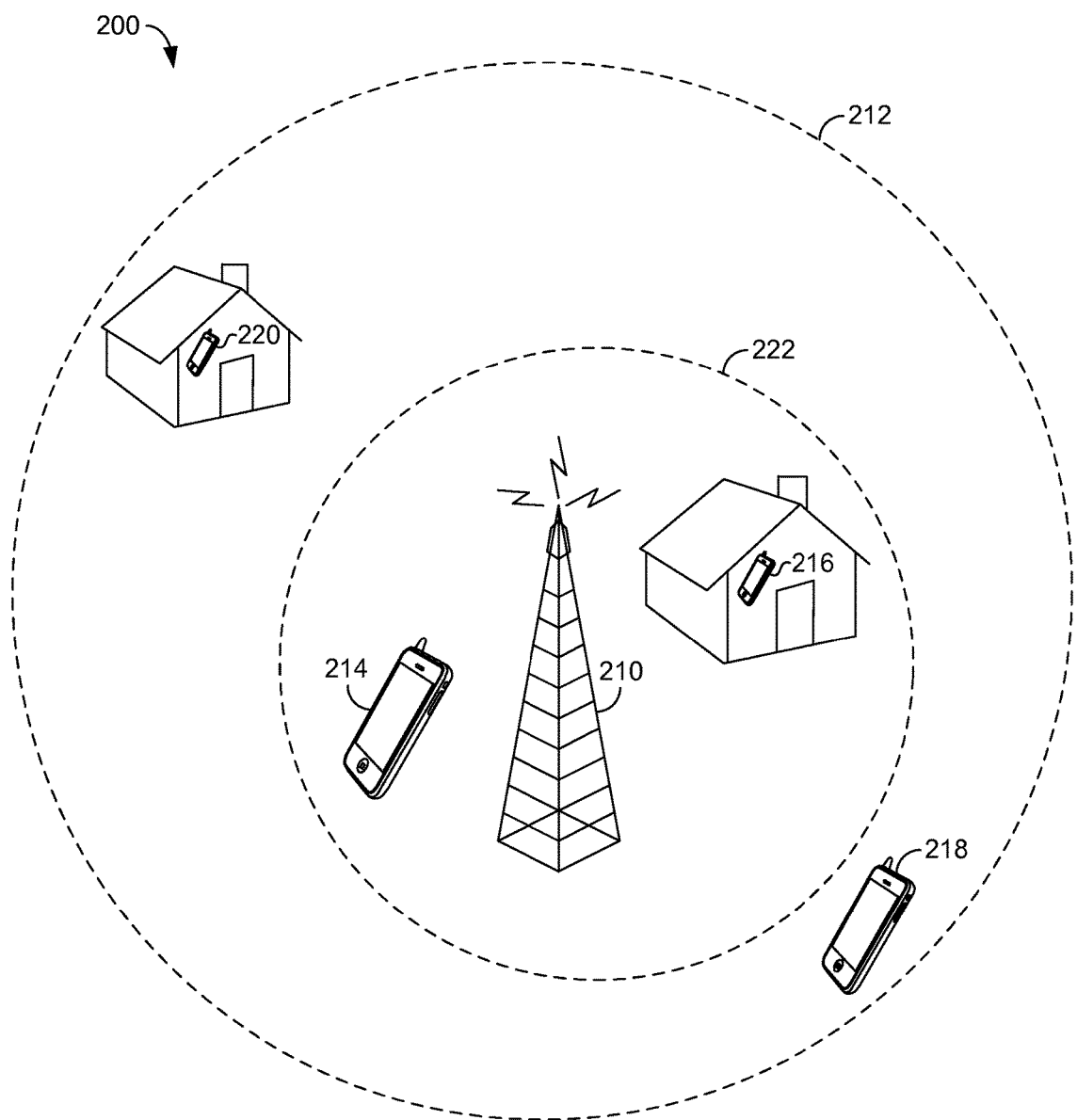
FIG. 2 depicts exemplary relationships between user devices and a serving base station according to an embodiment of the invention.

Turning now to FIG. 2, an illustration is provided, referenced generally by the numeral 200, depicting an exemplary relationship between a base station 210 and user devices 214, 216, 218, and 220 located within a geographic area or serving cell sector 212 served by the base station. The user devices 214, 216, 218, and 220 may be the same as the user device 150 of FIG. 1. The base station 210 may, in an LTE network, be known as an eNodeB. The base station 210 may be associated with a wireless-telecommunications-network (the "network"). The network is assigned a limited amount of bandwidth in one of several frequency bands. The frequency bands are configured to transmit different technologies such as LTE, CDMA, EvDO, and the like. In an exemplary aspect, the frequency bands may comprise an 800 MHz band, a 1900 MHz band, and a 2.5 GHz band. These are exemplary frequency bands only, and it is contemplated that the scope of the invention encompasses multiple different frequency bands. In general, the frequency bands may be divided into a lower-frequency band group and a higher-frequency band group. The lower-frequency band group may comprise frequency bands generally below 1 GHz (1000 MHz), while the higher-frequency band group may comprise frequency bands of greater than 1 GHz (1000 MHz). Thus, for example, an 800 MHz band would be considered a lower-frequency band and a 1900 MHz band would be considered a higher-frequency band.

The user devices 214, 216, 218, and 220 may be located at varying distances from the base station 210. For instance, the user devices 214 and 216 are located generally close to the base station 210, while the user devices 218 and 220 are located towards the edge of the serving cell sector 212. In general, the signal strength at the user devices 214 and 216 (i.e., the devices that are located close to the base station) will be higher than the signal strength at the user devices 218 and 220 because these devices are located further away from the base station 210, and the RF signal transmitted by the base station 210 loses strength as it travels over the longer distances.

The user devices 214, 216, 218, and 220 may also be physically located in one of several settings. For instance, the user devices 214 and 218 as depicted in FIG. 2 are located in an open-air environment. As used throughout this disclosure, the term "open-air environment" means a geographical setting in which physical barriers that act to reflect or diffract the RF signal transmitted by the base station 210, thereby reducing the signal strength at the user device, are minimal. Physical barriers may comprise, for example, building structures, cars, billboards, hills, tunnels, and the like. In an open-air environment, the loss in signal strength is generally attributable solely to free-space path loss over the distance from the device to the base station 210 and can be calculated using the known formula for free-space path loss (FSPL).

Another setting as indicated in FIG. 2 for the user devices 216 and 220 is building structures. As used throughout this disclosure, the term "buildings" or "building structures" is meant to encompass physical barriers such as, for example, homes, cars, office buildings, malls, and the like that reflect or diffract the RF signal transmitted by the base station 210. Because of the reflection and/or diffraction of the RF signal, the signal strength at the user device is further reduced over what is accounted for by the distance from the base station and the free-space path loss function. The further loss in signal strength is known as penetration loss or enclosure loss. Other structures such as, for example, hills, mountains, billboards, tunnels, and the like may also act to reflect and/or diffract the RF signals transmitted by the base station 210 and are also contemplated as being within the scope of the invention. The amount of penetration loss can be influenced by the location of the user device within the building. For instance, user devices located in the interior of the building without access to exterior doors and/or windows will typically have a higher penetration loss than user devices located close to windows and/or exterior doors). Characteristics of the individual building may also impact the penetration loss for the user device. For example, some buildings use windows shielded with certain metals or compositions that act to reflect and/or diffract RF signals and increase penetration loss.

Because the network typically has a limited amount of bandwidth in the lower-frequency bands, it is important to regulate subscriber usage of the lower-frequency band. Thus, in an exemplary aspect, user devices, such as the user devices 218 and 220 that are located beyond a predefined distance from the base station as indicated by the dashed circle 222 are allocated a lower-frequency band by the base station 210 such as, for example, an 800 MHz band. As explained above, lower-frequency band groups generally experience less free-space path loss than higher-frequency band groups over the same distance.

In an exemplary aspect, the predefined distance threshold indicated by the circle 222 is configurable. Further, the predefined distance threshold may be particular to the base station. For example, different distance thresholds may be associated with different base stations within the network based on, for example, different morphological characteristics associated with the each base station's serving cell sector. In an example, the predefined distance threshold may be dynamically increased (i.e., the diameter of the circle 222 may be increased) during periods of high subscriber utilization of the base station's frequency bands, and the lower-frequency band(s) in particular, thereby restricting the lower-frequency band to a fewer number of user devices. Likewise, the predefined distance threshold may be dynamically decreased (i.e., the diameter of the circle 222 may be decreased) during periods of low subscriber utilization thereby opening up the lower-frequency band to a greater number of user devices. In another example, if data speeds drop below a certain threshold for the lower-frequency band, the predefined distance threshold may be dynamically increased thereby moving some subscribers off of the lower-frequency band and on to the higher-frequency bands. Similarly, if data speeds for the lower-frequency band are maintained above the data speed threshold, the predefined distance threshold may be dynamically decreased allowing more subscribers to potentially utilize the lower-frequency band. Any and all such aspects, and any variation thereof, are contemplated as being within the scope of the invention.

For those user devices, such as the user devices 214 and 216 that are located within the predefined distance threshold (e.g., located within the circle 222), additional factors may be considered when determining which frequency band to allocate to the user devices 214 and 216. In an exemplary aspect, the penetration loss experienced by the user devices 214 and 216 may be considered. With respect to FIG. 2, since the user device 216 is located within a building, the penetration loss associated with the device 216 will generally be greater than that associated with the user device 214 which is located in an open-air environment. If the penetration loss associated with the user device 216 is greater than a penetration loss threshold, the user device 216 is allocated a lower-frequency band such as, for example, an 800 MHz band which has greater penetration abilities than higher-frequency bands. If the penetration loss associated with the user device 216 is less than the penetration loss threshold, however, the user device 216 is allocated a higher-frequency band.

Like the distance threshold, the penetration loss threshold is dynamically configurable. Additionally, like the distance threshold, the different penetration loss thresholds may be associated with the different base stations within the network. In an example, the penetration loss threshold may be dynamically increased during periods of high subscriber use of the base station's frequency bands, particularly high subscriber use of the lower-frequency band(s), thereby limiting the number of user devices on the lower-frequency band. Likewise, the penetration loss threshold may be dynamically decreased during periods of low subscriber use thereby increasing the potential number of user devices that can utilize the lower-frequency band. The penetration loss threshold may also be increased when data speeds on the lower-frequency band drop below a certain speed, and the penetration loss threshold may be decreased when the data speeds on the lower-frequency band are above a certain speed. Any and all such aspects, and any variation thereof, are contemplated as being within the scope of the invention.

Figure 3:
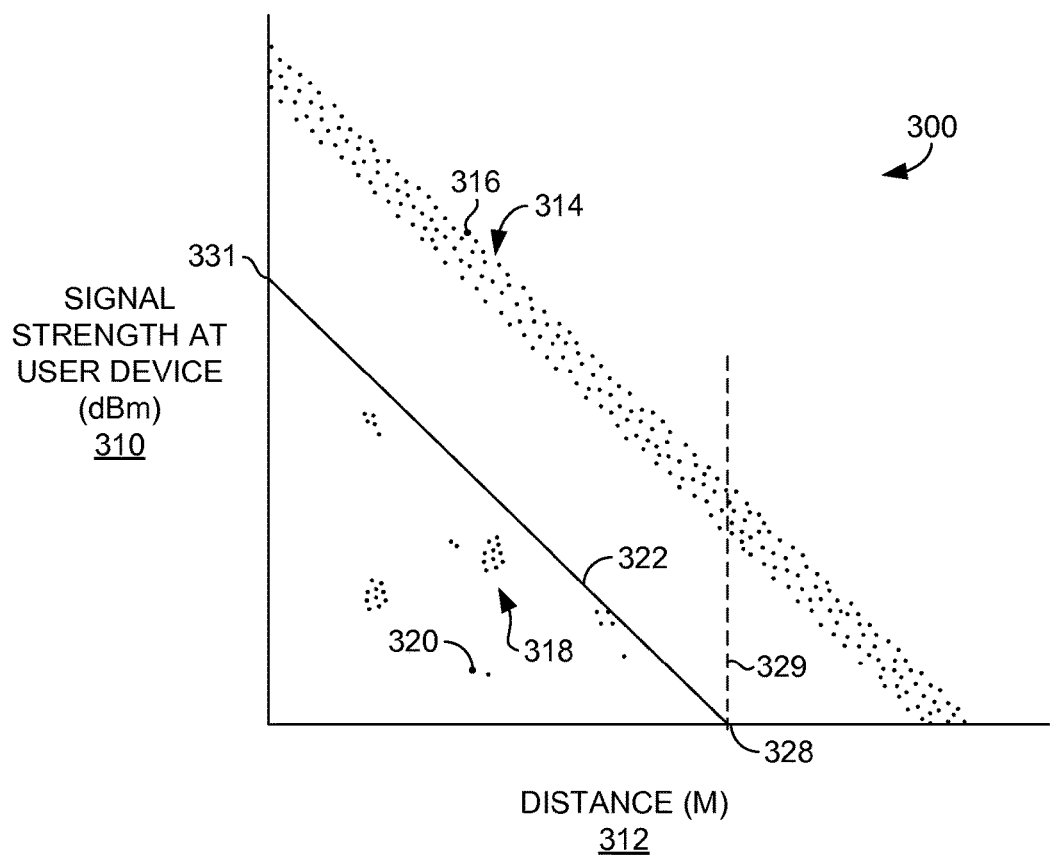
FIG. 3 depicts an exemplary graph illustrating a configurable threshold line used to allocate higher-frequency bands and lower-frequency bands to a user device according to an embodiment of the invention.

FIG. 3 depicts an exemplary graph 300 of signal strength 310 measured at the user device in decibels (dBm) above a reference level of one (1) milliwatt along the y-axis versus distance in meters (m) 312 of the user device from the base station along the x-axis. Each data point displayed in the graph 300 indicates a user device. As seen in FIG. 3, there is a cluster of user devices 314 having signal strengths that gradually diminish as the distance from the user devices 314 to the base station increases. This pattern is consistent with the user devices 314 being in an open-air environment. As discussed above, the signal strength at the user devices 314 is generally equal to the signal strength at the base station minus any free-space path loss that occurs over the distance from the user devices 314 to the base station.

As shown in FIG. 3, there is also a cluster of user devices 318 whose measured signal strength is below that of corresponding user devices 314 located at the same distance from the base station. Taking the user device 320 as a representative example, the signal strength at the user device 320 is substantially below that of the user device 316 that is located in an open-air environment at approximately the same distance from the base station. The discrepancy in signal strength between the user devices 316 and 320 may be due to the user device 320 being located within, for example, a building. In other words, the user device 320 may be associated with a greater penetration loss factor than that of the user device 316. To put it yet another way, with respect to a particular user device, the signal strength at the device may be inversely proportional to the penetration loss factor associated with the device—the higher the signal strength at the device, the lower the penetration loss factor, and the lower the signal strength at the device, the higher the penetration loss factor.

The graph 300 further includes a configurable signal strength threshold line 322. The configurable signal strength threshold line 322 intersects the x-axis at a distance 328 and intersects the y-axis at a signal strength 331. As mentioned above, because the signal strength at the user device is inversely proportional to the penetration loss factor associated with the device, the signal strength threshold line 322 may be considered equivalent to a penetration loss threshold line.

In an exemplary aspect, user devices located to the right of the distance threshold line 329 (e.g., located at a distance greater than the distance 328 from the base station) may be allocated a lower-frequency band by the base station. User devices located to the left of the distance threshold line 329 (e.g., located at a distance less than the distance 328 from the base station) and having a signal strength greater than that indicated by the signal strength threshold line 322 for that distance may be allocated a higher-frequency band by the base station. User devices such as these are generally located close to the base station and because there is minimal penetration loss associated with these devices, there is no need to allocate lower-frequency bands to them. In a further exemplary aspect, user devices located to the left of the distance threshold line 329 and having a signal strength less than that indicated by the signal strength threshold line 322 for that distance may be allocated a lower-frequency band by the base station. These user devices typically experience low signal strength due to penetration loss because the user devices are located within, for example, buildings or other structures.

The distance 328 may be independently configurable. For example, the distance 328 may be increased which may help to restrict the number of user devices utilizing the lower-frequency band. An increase in the distance 328 would cause a corresponding decrease in the slope of the signal strength threshold line 322. Decreasing the distance 328 potentially shifts more of the user devices to the lower-frequency band. A decrease in the distance 328 would cause a corresponding increase in the slope of the signal strength threshold line 322.

Figure 4:
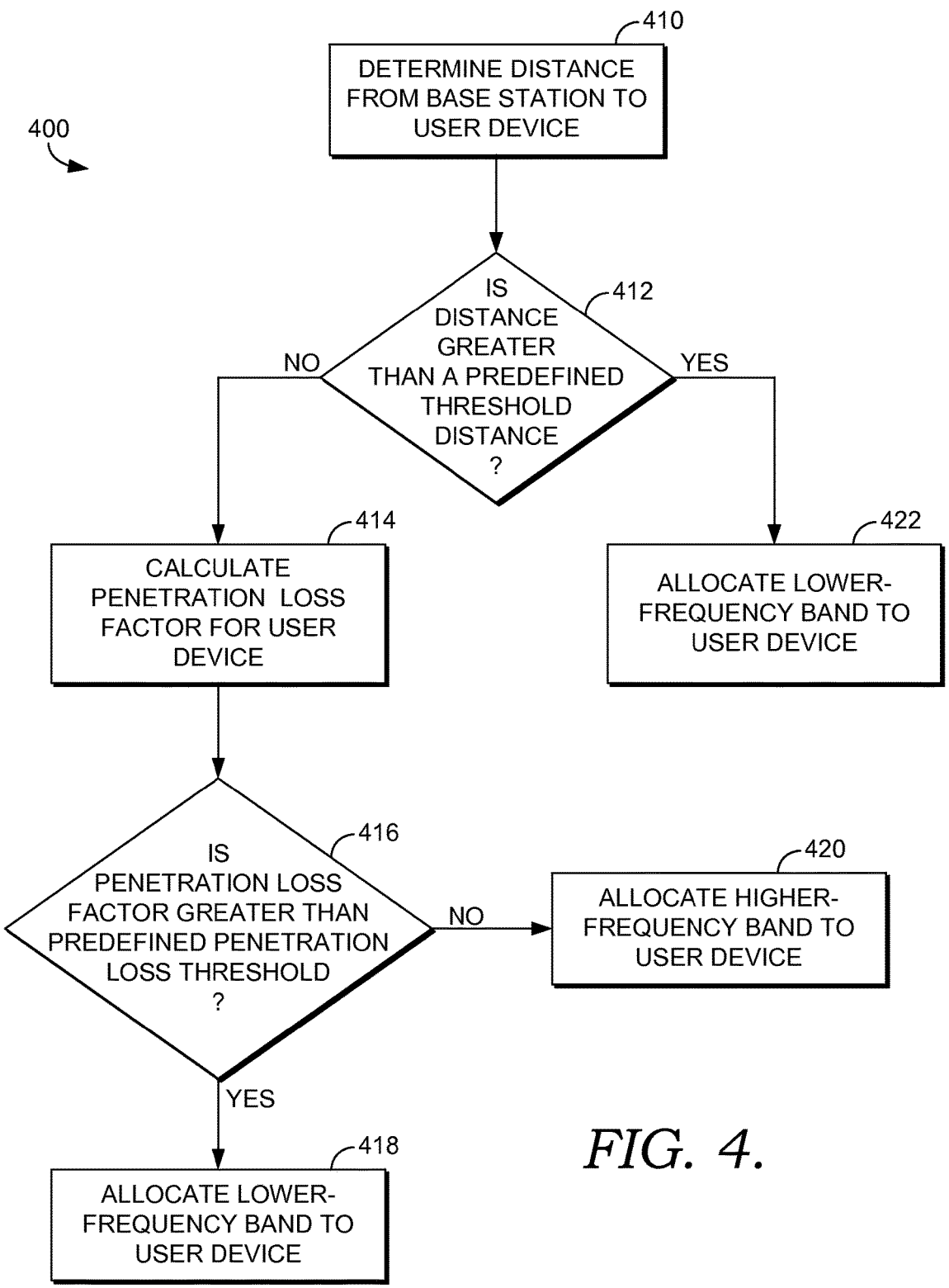
FIG. 4 depicts a flow diagram of an exemplary method of optimizing signal strength at a user device by allocating frequency bands based on distance of the user device from a serving base station and a penetration loss factor associated with the device according to an embodiment of the technology.

FIG. 4 depicts a flow diagram of an exemplary method 400 of dynamically allocating frequency bands transmitted by a base station to a user device to optimize signal strength at the device. At a step 410, a distance from the base station to the user device is determined. Because both the base station and the user device use GPS for signal timing, the base station is able to measure a time-offset when the user device connects to the base station. More particularly, the base station measures the time-offset from the user device's signal to that of the base station's GPS-based time. Based on the time-offset, the base station is able to determine how far the user device is located from the base station.

At a step 412, a determination is made as to whether the measured distance from the base station to the user device is greater than a predefined distance threshold. As indicated above, the distance threshold may be dynamically adjustable and may be particular or unique to the base station. If it is determined at the step 412 that the distance from the base station to the user device is greater than the predefined distance threshold, then, at a step 422, a lower-frequency band is allocated to the user device. The lower-frequency band, in one exemplary aspect, may comprise an 800 MHz band but other lower-frequency bands are contemplated as being within the scope of the invention. The lower-frequency band typically experiences less free-space path loss over a particular distance as compared to higher-frequency bands and, thus, helps to optimize signal strength at the user device.

If however, it is determined at the step 412 that the distance from the base station to the user device is less than the predefined distance threshold, then, at a step 414, a penetration loss factor for the user device is calculated. In an exemplary aspect, the penetration loss factor for the user device may be calculated according to the following formula:

Penetration Loss Factor=Signal Strength$_{Base\ Station}$−FSPL−Signal Strength$_{Device}$ The "Signal Strength$_{Base\ Station}$" is the strength of the RF signal transmitted by the base station as measured in dBm, the "Distance" in meters (m) is the distance from the base station to the user device and is known using the time-offset information, and "FSPL" in decibels (dB) is the known formula for free-space path loss. The "Signal Strength$_{Device}$" is the signal strength at the device (measured in dBm) and can be calculated using known methods based on power strength measurements communicated by the user device to the base station.

At a step 416, a determination is made as to whether the penetration loss factor for the user device calculated at the step 414 is greater than a predefined penetration loss threshold. This threshold is dynamically adjustable and may be particular or unique to the base station. If the device's penetration loss factor is greater than the predefined penetration loss threshold, then, at a step 418, a lower-frequency band is allocated to the user device. This may be the same lower-frequency band as that allocated in the step 422, or it may be a different lower-frequency band. In an exemplary aspect, the lower-frequency band is an 800 MHz band, but other lower-frequency bands are contemplated as being within the scope of the invention. As explained above, the penetration loss factor for the user device may be greater than the predefined penetration loss threshold when the user device is located within, for example, a building structure, a car, a tunnel, or the like. It also may occur when the user device is located outside of a building structure but is being shielded by, for example, a billboard, a building, a hill, or the like. Because lower-frequency bands exhibit greater penetration abilities as compared to higher-frequency bands, the use of lower-frequency bands when the device's penetration loss factor is greater than the threshold helps to optimize signal strength at the device.

If, however, it is determined at the step 416 that the user device's penetration loss factor is less than the predefined penetration loss threshold, then, at a step 420, a higher-frequency band is allocated to the user device. In an exemplary aspect, the higher-frequency band may comprise a 1900 MHz band, or a 2.5 GHz band although other frequency band are contemplated as being within the scope of the invention. Utilizing the method 400 helps the base station to efficiently allocate its frequency bands and, in particular, enables efficient utilization of the limited bandwidth associated with the lower-frequency bands.

Figure 5:
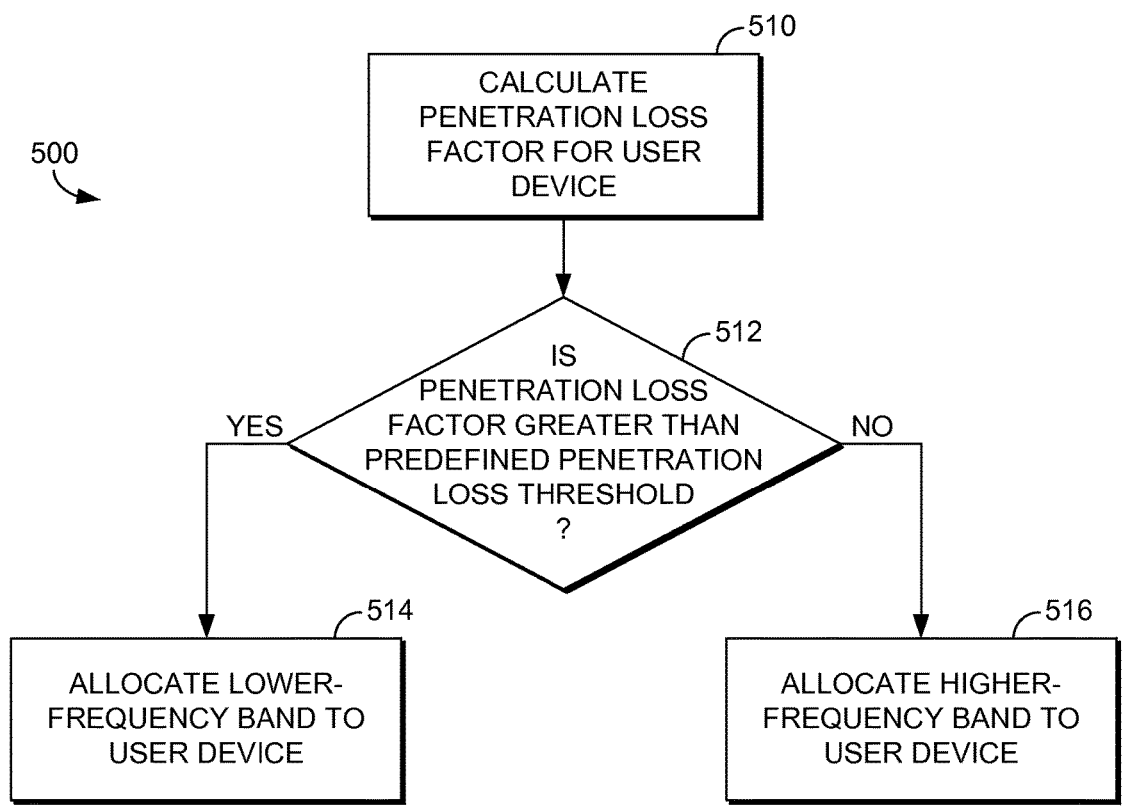
FIG. 5 depicts a flow diagram of an exemplary method of optimizing signal strength at a user device by allocating frequency bands based on a penetration loss factor associated with the user device according to an embodiment of the technology.

Turning to FIG. 5, a flow diagram is depicted of an exemplary method 500 of dynamically allocating frequency bands transmitted by a base station to a user device to optimize signal strength at the user device. At a step 510, a penetration loss factor for the user device is calculated using the formula given above.

At a step 512, a determination is made as to whether the penetration loss factor for the user device is greater than a predefined penetration loss threshold. As mentioned, the penetration loss threshold is dynamically configurable and may be adjusted based on a variety of different factors. For example, the penetration loss threshold may be adjusted upward during periods of high subscriber utilization of the base station's resources, particularly high subscriber utilization of the lower-frequency band(s), in order to reserve the lower-frequency band for those user devices that are experiencing significant penetration loss. Likewise, the penetration loss threshold may be adjusted downward during periods of low subscriber utilization of the base station's resources (e.g., during evenings or weekends). This opens up the lower-frequency band to more user devices. The penetration loss threshold may also be adjusted upward when data speeds on the lower-frequency band slow below a certain speed. This helps to move traffic off of the lower-frequency band and increase data speeds. Similarly, the penetration loss threshold may be adjusted downward when data speeds on the lower-frequency band are maintained above a certain speed.

If it is determined at the step 512, that the device's penetration loss factor is greater than the penetration loss threshold, then, at a step 514, a lower-frequency band is allocated to the user device in order to optimize signal strength at the device. If it is determined that the device's penetration loss factor is less than the penetration loss threshold, then, at a step 516, a higher-frequency band is allocated to the user device.

The method 500 may further comprise monitoring the penetration loss factor for the user device to determine if it changes. This may occur, for instance, when the user device moves from an open-air environment to a building or vice versa. If, in one aspect, the penetration loss factor for the device is originally below the predefined penetration loss threshold and then increases beyond the penetration loss threshold, then a timer may be initiated. If the penetration loss factor for the device stays at the increased level beyond a configurable time period as indicated by the timer, then a lower-frequency band may be allocated to the user device at the expiration of the timer. The same method may be applied if the penetration loss factor for the device is originally greater than the predefined penetration loss threshold and then decreases to less than the penetration loss threshold. If the device stays at the decreased level beyond a configurable time period indicated by the timer, then a higher-frequency band is allocated to the user device. Using a time delay prevents the user device from rapidly switching back-and-forth between frequency bands which may degrade the subscriber's network experience.

The method 500 may be carried out independently of the method 400. For example, in an exemplary aspect, a penetration loss factor may be calculated for each user device served by the base station. In other aspects, and as described above with respect to the method 400, the penetration loss factor may be calculated only for those user devices that are within a predefined distance threshold of the base station. Any and all such aspects, and any variation thereof, are contemplated as being within the scope of the invention.

Figure 6:
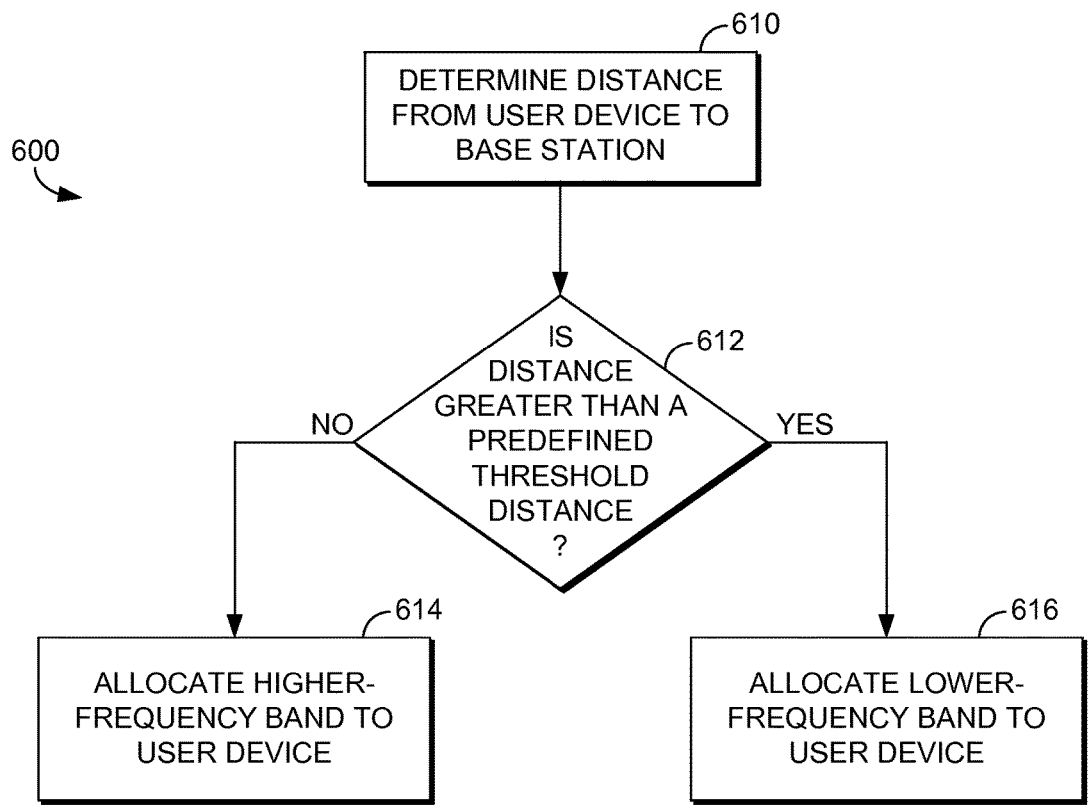
FIG. 6 depicts a flow diagram of an exemplary method of optimizing signal strength at a user device by allocating frequency bands based on a distance of the user device from a serving base station according to an embodiment of the technology.

FIG. 6 depicts a flow diagram of an exemplary method 600 of dynamically allocating frequency bands transmitted by a base station to a user device to optimize signal strength at the device. At a step 610, a distance from the user device to the base station is determined using the time-offset information as explained above with respect to the method 400.

At a step 612, a determination is made as to whether the distance is greater than a predefined distance threshold. The distance threshold is dynamically configurable and, in an exemplary aspect, may be adjusted upward during periods of high subscriber utilization of the base station's lower-frequency band(s) and/or based on data speeds on the lower-frequency band(s) dropping below a certain speed. By adjusting the threshold upward, the amount of user devices utilizing the lower-frequency band is restricted. The distance threshold may be adjusted downward during, for example, periods of low subscriber utilization of the base station's resources and/or when data speeds on the lower-frequency bands are above a certain speed. This opens the lower-frequency band to a greater number of user devices.

If the determination is made at the step 612 that the distance from the user device to the base station is below the distance threshold, then, at a step 614, the base station allocates a higher-frequency band to the user device. If the distance from the user device to the base station is greater than the distance threshold, then, at a step 616, a lower-frequency band is allocated to the user device.

The distance from the base station to the user device may be monitored to determine if it changes. If the user device is originally at a distance that is less than the distance threshold and then moves to a distance that is greater than the distance threshold, then a timer may initiated. If the device stays at the greater distance longer than a predefined time period, then a lower-frequency band may be allocated to the user device. Conversely, if the user device is originally at a distance that is greater than the distance threshold and moves to a distance that is less than the distance threshold, a higher-frequency band may be allocated to the user device at the expiration of the time period.

The method 600 may be carried out independently of the methods 400 and 500. Alternatively, the method 500 may be part of the method 400 as described above. Any and all such aspects, and any variation thereof, are contemplated as being within the scope of the invention.

The ability to allocate frequency bands to user devices based on factors such as the distance from the base station to the devices and/or penetration loss factors associated with the user devices helps in the efficient utilization of the limited bandwidth typically associated with lower-frequency bands.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer executable instructions embodied thereon that, when executed, perform a method of dynamically allocating frequency bands transmitted by a base station to a user device to optimize signal strength at the user device, the method comprising:
   determining a distance from the base station to the user device, wherein determining the distance from the base station to the user device comprises: 1) measuring a time-offset from the user device's signal to a GPS-based time associated with the base station, and 2) based on the time-offset, determining the distance the user device is located from the base station; and
   determining if the distance is greater than or less than a predefined distance threshold, wherein:
      when the distance is less than the predefined distance threshold:
      calculating a penetration loss factor for the user device, wherein when the penetration loss factor is above a predefined penetration loss threshold, allocating a lower-frequency band to the user device, and wherein when the penetration loss factor is below the predefined penetration loss threshold, allocating a higher-frequency band to the user device; and
      when the distance is greater than the predefined distance threshold, allocating the lower-frequency band to the user device.

2. The media of claim 1, wherein the predefined distance threshold is particular to the base station.

3. The media of claim 1, wherein the predefined distance threshold is adjustable.

4. The media of claim 3, wherein the predefined distance threshold is adjusted upward during periods when the base station has high subscriber use.

5. The media of claim 3, wherein the predefined distance threshold is adjusted downward during periods when the base station has low subscriber use.

6. The media of claim 1, wherein the predefined penetration loss threshold is particular to the base station.

7. The media of claim 1, wherein the predefined penetration loss threshold is adjustable.

8. The media of claim 7, wherein the predefined penetration loss threshold is adjusted upward during periods of time when the base station has high subscriber use.

9. The media of claim 7, wherein the predefined penetration loss threshold is adjusted downward during periods of time when the base station has low subscriber use.

10. The media of claim 1, wherein the lower-frequency band comprises an 800 MHz band.

11. The media of claim 1, wherein the higher-frequency band comprises a 1900 MHz band.

12. A computerized method carried out by at least one server having at least one processor for dynamically allocating frequency bands transmitted by a base station to a user device to optimize signal strength at the user device, the method comprising:
   determining that a distance from the base station to the user device is less than a predefined distance threshold, wherein the distance from the base station to the user device is determined by: 1) measuring a time-offset from the user device's signal to a GPS-based time associated with the base station, and 2) based on the time-offset, determining the distance the user device is located from the base station;
   calculating a penetration loss factor for the user device;
   determining, using the at least one processor, if the penetration loss factor is greater than or less than a predefined penetration loss threshold, wherein:
      when the penetration loss factor is greater than the predefined penetration loss threshold, allocating a lower-frequency band to the user device, and
      when the penetration loss factor is less than the predefined penetration loss threshold, allocating a higher-frequency band to the user device.

13. The computerized method of claim 12, wherein the penetration loss factor is calculated subsequent to determining that the distance from the user device to the base station is less than the predefined distance threshold.

14. The computerized method of claim 13, further comprising:
when the penetration loss factor is less than the predefined penetration loss threshold, monitoring the penetration loss factor for the user device;
determining that the penetration loss factor for the user device has increased such that the penetration loss factor is now greater than the predefined penetration loss threshold;
instituting a predefined time delay; and
allocating the lower-frequency band to the user device after the predefined time delay has expired.

15. The computerized method of claim 13, further comprising:
when the penetration loss factor is greater than the predefined penetration loss threshold, monitoring the penetration loss factor for the user device;
determining that the penetration loss factor for the user device has decreased such that the penetration loss factor is now less than the predefined penetration loss threshold;
instituting a predefined time delay; and
allocating the higher-frequency band to the user device after the predefined time delay has expired.

16. The computerized method of claim 12, wherein the predefined penetration loss threshold is adjusted based on at least one of time of day or day of the week.

17. The computerized method of claim 12, wherein the predefined penetration loss threshold is adjusted based on data speeds at the user device.

18. A system for dynamically allocating frequency bands transmitted by a base station to a user device to optimize signal strength at the user device, the system comprising:
a computing device associated with the base station having one or more processors and one or more computer-readable media; and
a data store coupled with the base station,
wherein the computing device:
determines a distance from the user device to the base station, wherein determining the distance from the base station to the user device comprises: 1) measuring a time-offset from the user device's signal to a GPS-based time associated with the base station, and 2) based on the time-offset, determining the distance the user device is located from the base station;
determines if the distance is greater than or less than a predefined distance threshold, wherein:
when the distance is greater than the predefined distance threshold, allocates a lower-frequency band to the user device; and
when the distance is less than the predefined distance threshold, allocates a higher-frequency band to the user device.

19. The system of claim 18, wherein when the distance is less than the predefined distance threshold, the computing device further:
calculates a penetration loss factor for the user device, wherein:
when the penetration loss factor is above a predefined penetration loss threshold, allocates the lower-frequency band to the user device, and
wherein when the penetration loss factor is below the predefined penetration loss threshold, continues to allocate the higher-frequency band to the user device.

20. The system of claim 18, wherein the predefined distance threshold is adjustable based on at least one of subscriber usage of the lower-frequency band or subscriber usage of the higher-frequency band.

* * * * *